US010141957B2

(12) United States Patent
Khlat et al.

(10) Patent No.: US 10,141,957 B2
(45) Date of Patent: Nov. 27, 2018

(54) RADIO FREQUENCY FRONT END CIRCUITRY WITH REDUCED INSERTION LOSS

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/430,646

(22) Filed: Feb. 13, 2017

(65) Prior Publication Data

US 2017/0237451 A1 Aug. 17, 2017

Related U.S. Application Data

(60) Provisional application No. 62/293,838, filed on Feb. 11, 2016.

(51) Int. Cl.
*H04B 1/44* (2006.01)
*H04B 1/00* (2006.01)

(52) U.S. Cl.
CPC ............. *H04B 1/0057* (2013.01); *H04B 1/44* (2013.01)

(58) Field of Classification Search
CPC .... H04B 1/0057; H04B 1/44; H04W 72/0453

USPC .......................................................... 375/219
See application file for complete search history.

(56) References Cited

U.S. PATENT DOCUMENTS

| 2012/0044919 | A1* | 2/2012 | Medapalli | .............. | H04B 1/406 |
| | | | | | 370/338 |
| 2015/0304048 | A1* | 10/2015 | Kim | .................... | G01R 33/0354 |
| | | | | | 398/45 |
| 2017/0005639 | A1 | 1/2017 | Khlat et al. | | |

* cited by examiner

*Primary Examiner* — Kevin M Burd
(74) *Attorney, Agent, or Firm* — Withrow & Terranova, P.L.L.C.

(57) ABSTRACT

Circuitry includes a primary antenna node, a secondary antenna node, a first set of input/output nodes, a second set of input/output nodes, a first diplexer, a second diplexer, and switching circuitry. The switching circuitry is arranged such that any one of the first set of input/output nodes and the second set of input/output nodes can be connected to the primary antenna node or the secondary antenna node, either through the first diplexer, the second diplexer, or directly by bypassing the first diplexer and the second diplexer while providing minimal insertion loss. In particular, the number of closed series switches in the signal paths provided between the one of the first set of input/output nodes and the second set of input/output nodes is minimized while still providing a large amount of flexibility in the switching paths that can be created by the switching circuitry.

20 Claims, 11 Drawing Sheets

RADIO FREQUENCY FRONT END CIRCUITRY WITH REDUCED INSERTION LOSS

RELATED APPLICATIONS

This application claims the benefit of provisional patent application Ser. No. 62/293,838, filed Feb. 11, 2016, the disclosure of which is hereby incorporated herein by reference in its entirety.

FIELD OF THE DISCLOSURE

The present disclosure relates to radio frequency (RF) front end circuitry, and specifically to RF front end circuitry designed for reduced insertion loss.

BACKGROUND

As wireless communications technology continues to evolve, there is a focus on improving both reliability and speed. In recent years, technologies such as multiple-input-multiple-output (MIMO) and carrier aggregation have been used to increase both speed and reliability of a wireless connection. At a high level, MIMO and carrier aggregation allow multiple radio frequency (RF) signals to be simultaneously transmitted and/or received by a device. These RF signals are generally transmitted at different frequencies and then separated by a receiving device to obtain the data therein. While this process is relatively straightforward when the frequencies of the RF signals are far apart, it becomes significantly more complex when they are not. This is due to the RF front end circuitry that is responsible for separating the received RF signals. Conventional RF front end circuitry often utilizes a tiered filtering approach in which RF signals are first separated into relatively large RF frequency bands, and then filtered with increasing granularity as they move downstream from an antenna, ultimately being separated into one or more RF operating bands. For example, a first filter in conventional RF front end circuitry may separate low-band RF signals (i.e., RF signals with a frequency between 700 MHz to 1000 MHz) from mid/high-band RF signals (i.e., RF signals with a frequency between 1800 MHz and 2700 MHz), a second filter downstream from the first filter may separate mid-band RF signals (i.e., RF signals with a frequency between 1800 MHz and 2200 MHz) from high-band RF signals (i.e., RF signals with a frequency between 2300 MHz and 2700 MHz), and a number of band filters downstream from the second filter may separate the mid-band RF signals and the high-band RF signals into separate RF operating bands (e.g., $3^{rd}$ Generation Partnership (3GPP) Long Term Evolution (LTE) operating bands).

Due to the relatively large separation between low-band RF signals and mid/high-band RF signals (i.e., ~800 MHz), the first filter in such a system is generally capable of separating these signals without issue. However, the narrow separation between mid-band RF signals and high-band RF signals (i.e., ~100 MHz) makes such a task much more difficult. Designing a filter with the required bandwidth to pass both mid-band RF signals and high-band RF signals may reduce the achievable selectivity of the filter. Due to this limited selectivity, mid-band RF signals at the upper end of the frequency band and high-band RF signals at the lower end of the frequency band will be cross-contaminated, and may reduce the performance of the RF front end circuitry such that certain combinations of operating bands are not usable for carrier aggregation and/or MIMO.

To address these issues, RF front end circuitry 10 has been proposed as shown in FIG. 1. The RF front end circuitry 10 includes a primary antenna 12, a secondary antenna 14, primary antenna swapping circuitry 16, secondary antenna swapping circuitry 18, a front end diplexer 20, reconfigurable RF filtering circuitry 22, first band filtering circuitry 24, and second band filtering circuitry 26. The primary antenna swapping circuitry 16 is coupled between the front end diplexer 20 and the primary antenna 12. The secondary antenna swapping circuitry 18 is coupled between a secondary RF signal node 28 and the secondary antenna 14. The reconfigurable RF filtering circuitry 22 is coupled between the first band filtering circuitry 24, the second band filtering circuitry 26, and the front end diplexer 20.

The primary antenna swapping circuitry 16 includes a number of primary antenna swapping switches $SW_{PAS}$. The secondary antenna swapping circuitry 18 includes a number of secondary antenna swapping switches $SW_{PAS}$. Together, the primary antenna swapping switches $SW_{PAS}$ and the secondary antenna swapping switches $SW_{PAS}$ are configured to couple one of the primary antenna 12 and the secondary antenna 14 to the front end diplexer 20 and couple the other one of the primary antenna 12 and the secondary antenna 14 to the secondary RF signal node 28. While not shown in order to avoid obscuring the drawings, the secondary RF signal node 28 is generally coupled to secondary RF filtering circuitry in order to separate secondary RF receive signals into their constituent RF operating bands for further processing. Those skilled in the art will appreciate that the one of the primary antenna 12 and the secondary antenna 14 coupled to the front end diplexer 20 is dependent on current signal conditions, and that the primary antenna 12 and the secondary antenna 14 may be dynamically swapped as desired in order to improve transmission and/or reception characteristics.

The front end diplexer 20 is configured to separate RF receive signals from one of the primary antenna 12 and the secondary antenna 14 into low-band RF receive signals and mid/high-band RF receive signals, separately delivering the low-band RF receive signals to a low-band RF signal node 30 and the mid/high-band RF receive signals to the reconfigurable RF filtering circuitry 22. Further, the front end diplexer 20 is configured to combine RF transmit signals from the low-band RF signal node 30 and the reconfigurable RF filtering circuitry 22 and provide these RF transmit signals to one of the primary antenna 12 and the secondary antenna 14 for transmission.

As discussed above, it is generally difficult for a filter to achieve the necessary bandwidth for passing mid-band RF signals and high-band signals while maintaining adequate selectivity to separate RF signals at the edges of these frequency bands. Accordingly, the reconfigurable RF filtering circuitry 22 includes a first reconfigurable RF filtering circuitry diplexer 32A, a second reconfigurable RF filtering circuitry diplexer 32B, and a number of reconfigurable RF filtering circuitry switches $SW_{RFC}$. The first reconfigurable RF filtering circuitry diplexer 32A is configured to separate RF signals within the mid-band from RF signals within a first subset of the high-band, while the second reconfigurable RF filtering circuitry diplexer 32B is configured to separate RF signals within the mid-band from RF signals within a second subset of the high-band. The first subset of the high-band may include a relatively narrow portion thereof at the lower end of the band (e.g., from 2300 MHz to 2400 MHz), while the second subset of the high-band may include the remaining portion of the high-band (e.g., 2400 MHz to 2700 MHz). Due to the relatively narrow portion of the high-band passed by the first reconfigurable RF filtering circuitry diplexer 32A, the selectivity of this portion of the diplexer may be significantly improved such that the first reconfigurable RF filtering circuitry diplexer 32A can adequately separate mid-band RF signals (even those at the upper end of the mid-band) from high-band RF signals at the lower end thereof.

In carrier aggregation configurations in which mid-band RF signals are simultaneously received along with high-band RF signals and the mid-band RF signals are relatively close in frequency to the high-band RF signals, the reconfigurable RF filtering circuitry switches $SW_{RFC}$ are configured to couple the first reconfigurable RF filtering circuitry diplexer 32A between the first band filtering circuitry 24, the second band filtering circuitry 26, and the front end diplexer 20. Accordingly, RF receive signals within the mid-band and the high-band that are relatively close in frequency can be adequately separated by the first reconfigurable RF filtering circuitry diplexer 32A and delivered to the first band filtering circuitry 24 and the second band filtering circuitry 26. In carrier aggregation configurations in which mid-band RF signals are simultaneously received along with high-band RF signals and the mid-band RF signals are relatively far apart in frequency to the high-band RF signals, the reconfigurable RF filtering circuitry switches $SW_{RFC}$ are configured to couple the second reconfigurable RF filtering circuitry diplexer 32B between the first band filtering circuitry 24, the second band filtering circuitry 26, and the front end diplexer 20. Accordingly, RF receive signals within the mid-band and the high-band that are relatively far apart in frequency can be adequately separated by the second reconfigurable RF filtering circuitry diplexer 32B and delivered to the first band filtering circuitry 24 and the second band filtering circuitry 26. In non-carrier aggregation configurations, the reconfigurable RF filtering switches $SW_{RFC}$ are configured to directly couple one of the first band filtering circuitry 24 and the second band filtering circuitry 26 to the front end diplexer 20. The first reconfigurable RF filtering circuitry diplexer 32A and the second reconfigurable RF filtering circuitry diplexer 32B can by bypassed in this case since the RF receive signals will fall within a single one of the mid-band and the high-band. Accordingly, in non-carrier aggregation configurations in which the first reconfigurable RF filtering circuitry diplexer 32A and the second reconfigurable RF filtering circuitry diplexer 32B are not necessary, the insertion loss associated therewith can be avoided.

The first band filtering circuitry 24 and the second band filtering circuitry 26 include a number of band filtering switches $SW_{BF}$ and a number of band filters 34. The band filtering switches $SW_{BF}$ are configured to couple one or more of the band filters 34 to the reconfigurable RF filtering circuitry 22. Each one of the band filters 34 is configured to isolate an RF signal within a particular RF operating band (or in some cases, RF signals within multiple RF operating bands) from other RF signals. RF receive signals from the reconfigurable RF filtering circuitry 22 are isolated via an appropriate band filter 34 and delivered to an appropriate one of a number of input/output nodes 36. RF transmit signals from downstream circuitry are received at one of the input/output nodes 36, isolated from other RF signals via an appropriate band filter 34, and delivered to the reconfigurable RF filtering circuitry 22 for transmission from one of the primary antenna 12 and the secondary antenna 14. Generally, only the band filters 34 associated with the particular RF operating bands being transmitted or received are coupled to the reconfigurable RF filtering circuitry 22 to avoid excessive loading of the signal paths.

Control circuitry 38 is coupled to each one of the primary antenna swapping circuitry 16, the secondary antenna swapping circuitry 18, the reconfigurable RF filtering circuitry 22, the first band filtering circuitry 24, and the second band filtering circuitry 26 in order to control the state of the switches therein and effectuate the functionality discussed below.

Due to the reconfigurable RF filtering circuitry 22, the RF front end circuitry 10 is capable of separating any combination of mid-band RF signals and high-band RF signals, thereby expanding the range of band combinations for carrier aggregation and/or MIMO. However, the configuration of the switches in the primary antenna swapping circuitry 16, the secondary antenna swapping circuitry 18, the reconfigurable RF filtering circuitry 22, the first band filtering circuitry 24, and the second band filtering circuitry 26 may introduce excessive insertion loss in the signal paths thereof. FIG. 2A shows a switch configuration in which the first reconfigurable RF filtering circuitry diplexer 32A in the reconfigurable RF filtering circuitry 22 is used to perform carrier aggregation between one or more mid-band RF signals and one or more high-band RF signals via the primary antenna 12. As shown, a second one of the primary antenna swapping switches $SW_{PAS2}$ is closed, while the remaining primary antenna swapping switches $SW_{PAS}$ are open. Further, a second one of the reconfigurable RF filtering circuitry switches $SW_{RFC2}$, a sixth one of the reconfigurable RF filtering circuitry switches $SW_{RFC6}$, and a seventh one of the reconfigurable RF filtering circuitry switches $SW_{RFC7}$, are closed, while the remaining reconfigurable RF filtering circuitry switches $SW_{RFC}$ are open. For exemplary purposes, a fourth one of the band filtering switches $SW_{BF4}$ is closed in the first band filtering circuitry 24 while the remaining band filtering switches $SW_{BF}$ are open. Similarly, a first one of the band filtering switches $SW_{BF1}$ is closed in the second band filtering circuitry 26 while the remaining band filtering switches $SW_{BF}$ are open.

Assuming a 0.20 dB insertion loss for each closed series switch in the signal path and a 0.025 dB insertion loss for each open parallel switch, a signal path from the primary antenna 12 to a second one of the input/output nodes 36B includes four closed series switches and ten open parallel switches for a total insertion loss of 1.05 dB. Notably, this is a conservative estimate of the actual insertion loss, as a number of band filtering switches $SW_{BF}$ associated with additional band filters 34 in the first band filtering circuitry 24 and the second band filtering circuitry 26 are not shown to avoid obscuring the drawings. A similar result is achieved when the second reconfigurable RF filtering circuitry diplexer 32B in the reconfigurable RF filtering circuitry 22 is used to perform carrier aggregation between one or more mid-band RF signals and one or more high-band RF signals via the primary antenna. Additional switches are added in the signal path when the secondary antenna 14 is used in these configurations.

FIG. 2B shows a switch configuration in which the first reconfigurable RF filtering circuitry diplexer 32A and the second reconfigurable RF filtering circuitry diplexer 32B are bypassed in a non-carrier aggregation mode. In the particular example shown in FIG. 2B, the primary antenna 12 is coupled via the front end diplexer 20 to the first band filtering circuitry 24. Accordingly, a second one of the primary antenna swapping switches $SW_{PAS2}$ is closed, while the remaining primary antenna swapping switches $SW_{PAS}$ are open. Further, a first one of the reconfigurable RF filtering circuitry switches $SW_{RFC1}$ is closed while the remaining reconfigurable RF filtering circuitry switches $SW_{RFC}$ are open. For purposes of example, a fourth one of the band filtering switches $SW_{BF4}$ in the first band filtering circuitry 24 is closed while the remaining band filtering switches $SW_{BF}$ are open.

Again assuming a 0.20 dB insertion loss for each closed series switch in the signal path and a 0.025 dB insertion loss for each open parallel switch, a signal path from the primary antenna 12 to the second one of the input/output nodes 36B includes three closed series switches and ten open parallel switches for a total insertion loss of 0.825 dB. Once again, this is a conservative estimate of the actual insertion loss, as a number of band filtering switches $SW_{BF}$ associated with additional band filters 34 in the first band filtering circuitry 24 and the second band filtering circuitry 26 are not shown to avoid obscuring the drawings. A similar result is achieved when only the second band filtering circuitry 26 is coupled to the front end diplexer 20.

The insertion loss added by the switching elements in the RF front end circuitry 10 may degrade the performance thereof, causing excessive power loss and thus reducing battery life of mobile wireless devices. Accordingly, there is a need for improved RF front end circuitry capable of supporting carrier aggregation and/or MIMO configurations between RF signals that are relatively close in frequency to one another.

SUMMARY

The present disclosure relates to radio frequency (RF) front end circuitry, and specifically to RF front end circuitry designed for reduced insertion loss. In one embodiment, circuitry includes a primary antenna node, a secondary antenna node, a first set of input/output nodes, a second set of input/output nodes, a first diplexer, a second diplexer, switching circuitry, and control circuitry. The first set of input/output nodes are each associated with RF signals within a first RF frequency band. The second set of input/output nodes are each associated with RF signals within a second RF frequency band. The first diplexer is configured to separate RF signals within the first RF frequency band from RF signals within a first subset of the second RF frequency band. The second diplexer is configured to separate RF signals within the first RF frequency band from RF signals within a second subset of the second RF frequency band. The switching circuitry is coupled between the primary antenna node, the secondary antenna node, the first set of input/output nodes, the second set of input/output nodes, the first diplexer, and the second diplexer. The control circuitry is coupled to the switching circuitry. In a carrier aggregation configuration, the control circuitry is configured to cause the switching circuitry to couple at least one of the first set of input/output nodes and at least one of the second set of input/output nodes to one of the primary antenna node and the secondary antenna node via one of the first diplexer and the second diplexer such that an insertion loss due to switching elements in the path between the at least one of the first set of input/output nodes and the primary antenna node is less than or equal to 0.9 dB. In a non-carrier aggregation configuration, the control circuitry is configured to cause the switching circuitry to couple at least one of the first set of input/output nodes and the second set of input/output nodes to one of the primary antenna node and the secondary antenna node such that the first diplexer and the second diplexer are bypassed and an insertion loss due to switching elements in the path between the primary antenna node and the at least one of the first set of input/output nodes and the second set of input/output nodes and the primary antenna node is less than or equal to 0.9 dB.

By operating the circuitry as described above, the performance of the circuitry is significantly improved by reducing the insertion loss due to switching elements, while still providing great flexibility in the number of switching configurations that the circuitry is capable of providing.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
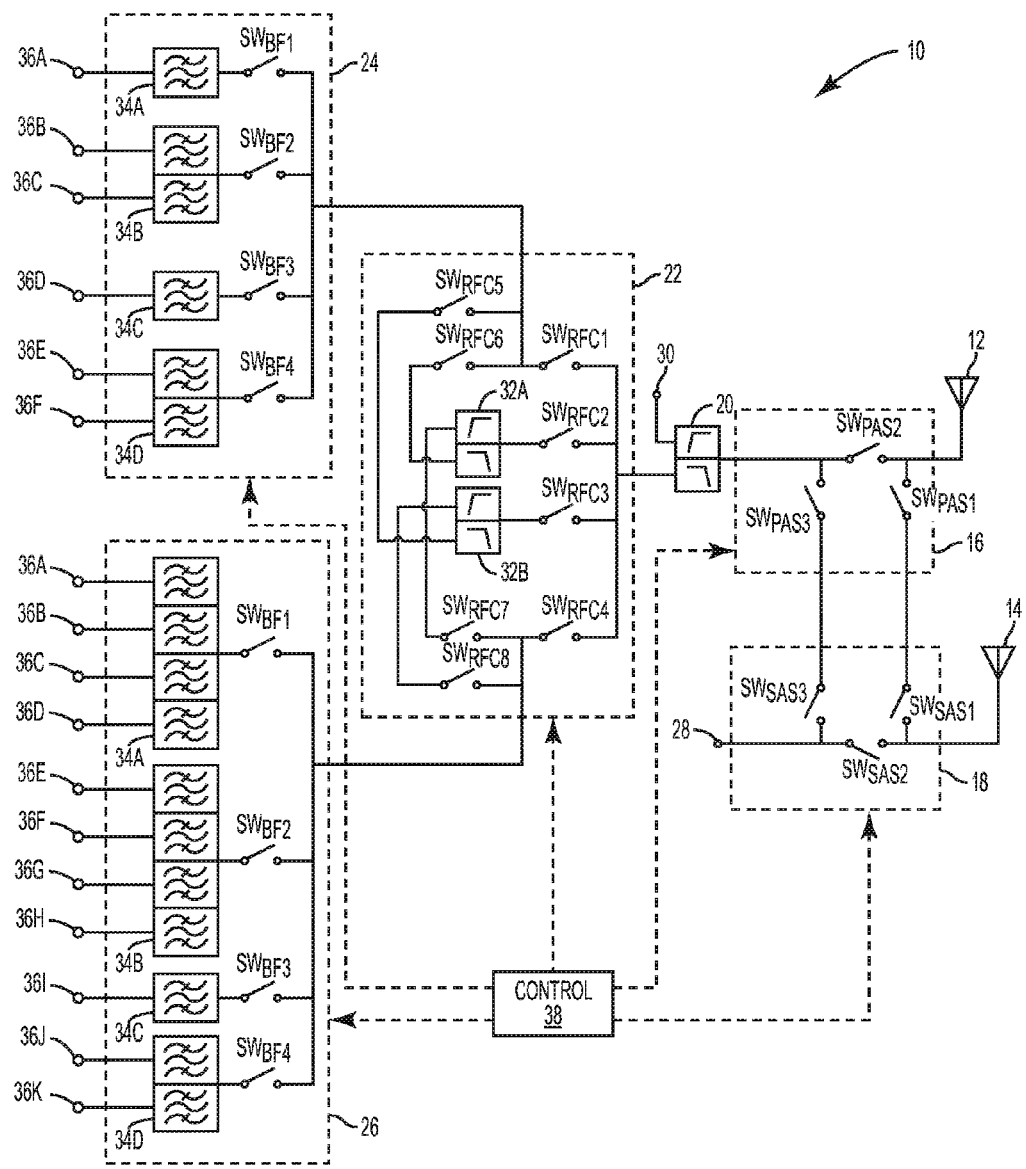
FIG. 1 is a functional schematic illustrating conventional radio frequency (RF) front end circuitry.
Figure 2A:
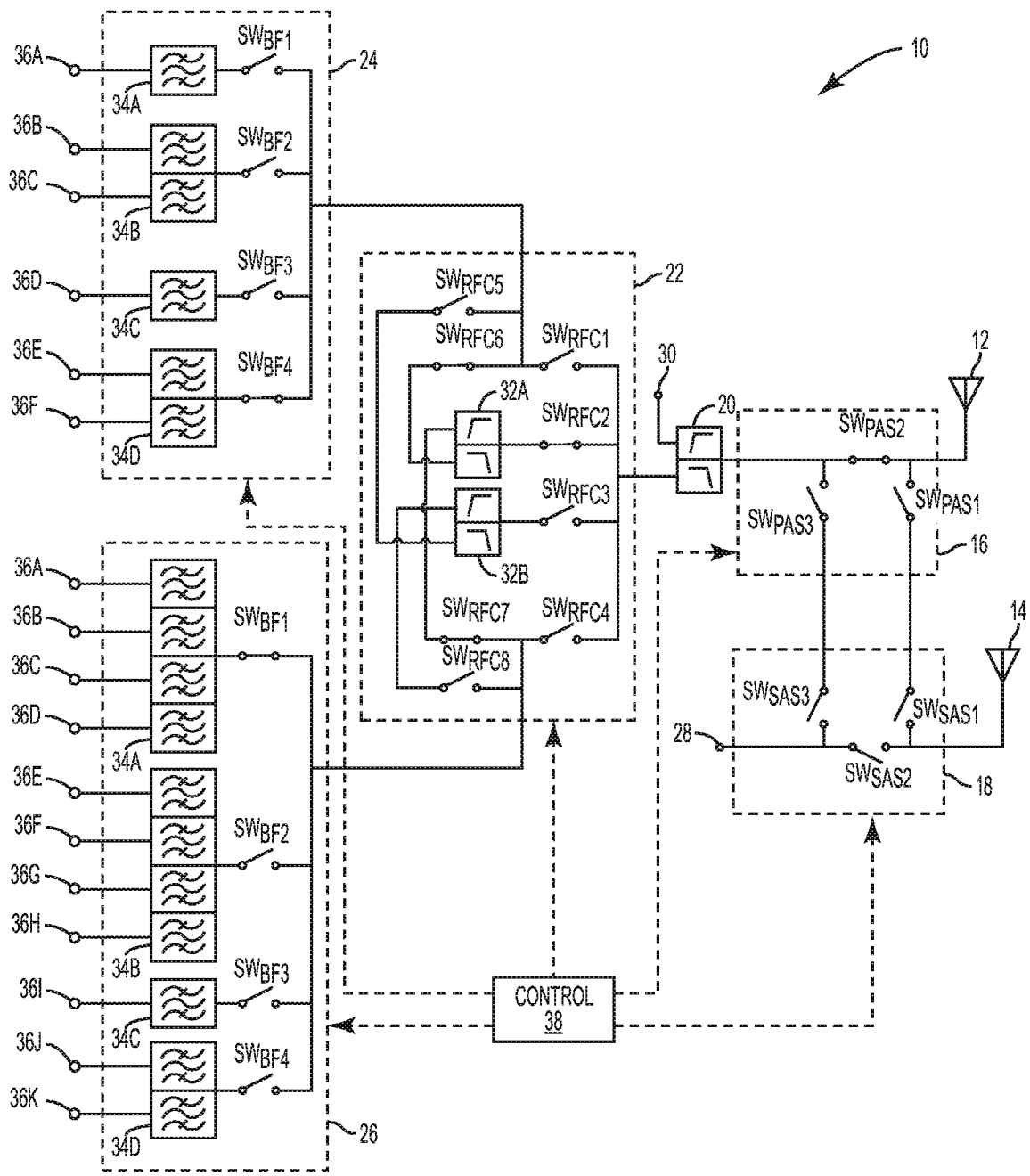
FIGS. 2A and 2B are functional schematics illustrating different switching configurations for the RF front end circuitry shown in FIG. 1.
Figure 2B:
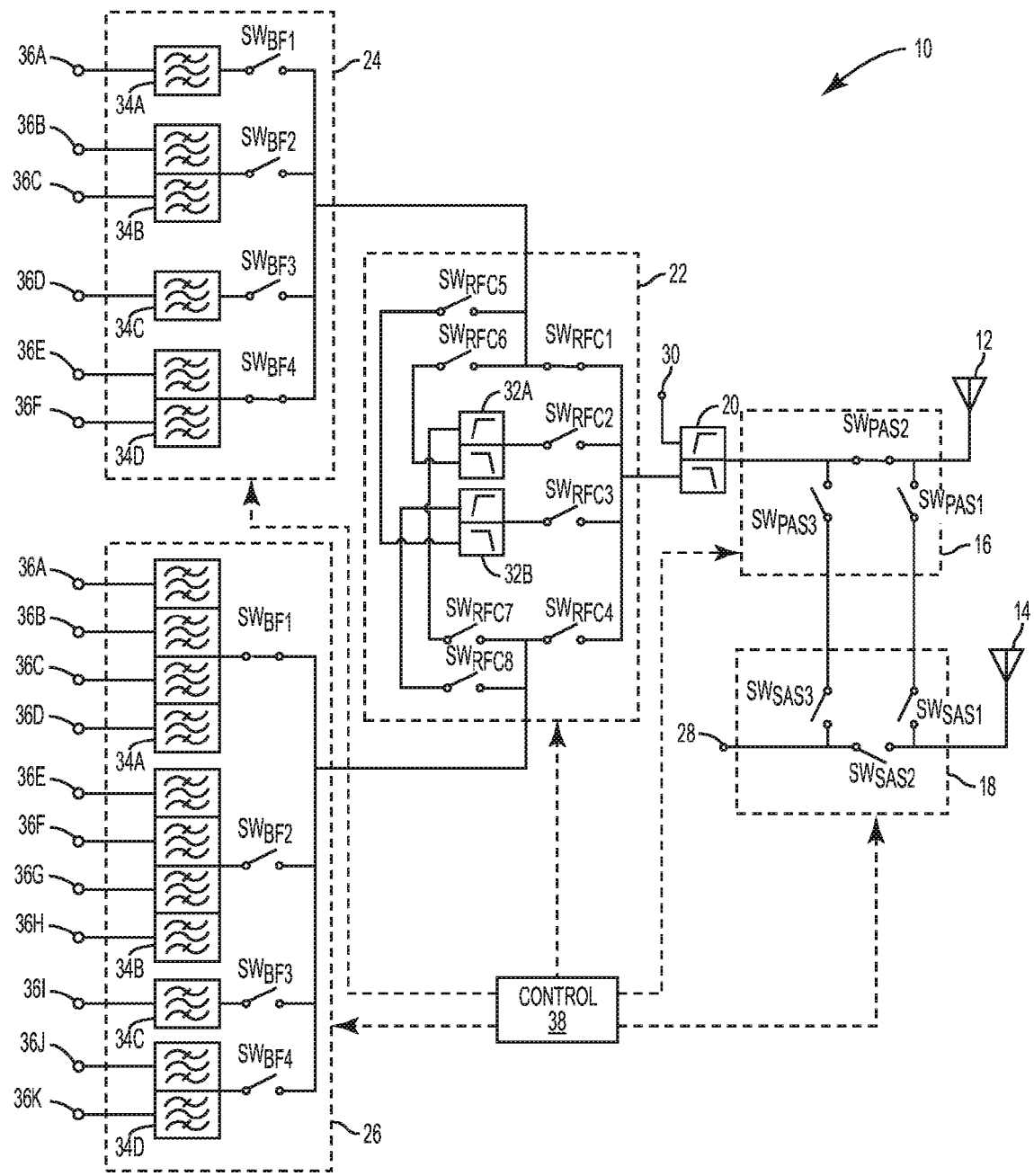

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
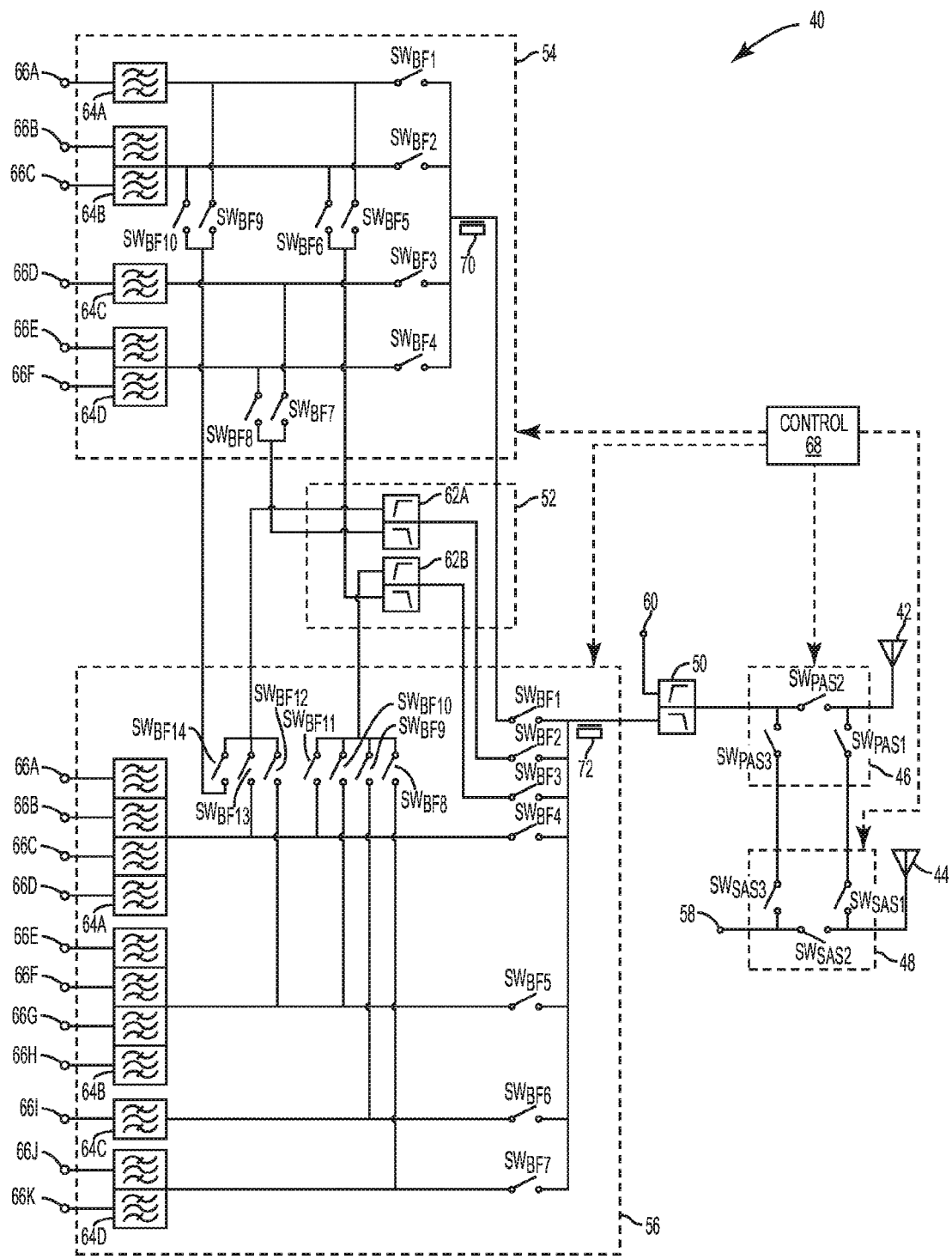
FIG. 3 is a functional schematic illustrating RF front end circuitry according to one embodiment of the present disclosure.

FIG. 3 shows radio frequency (RF) front end circuitry 40 according to one embodiment of the present disclosure. The RF front end circuitry 40 includes a primary antenna 42, a secondary antenna 44, primary antenna swapping circuitry 46, secondary antenna swapping circuitry 48, a front end diplexer 50, reconfigurable RF filtering circuitry 52, first band filtering circuitry 54, and second band filtering circuitry 56. The primary antenna swapping circuitry 46 is coupled between the front end diplexer 50 and the primary antenna 42. The secondary antenna swapping circuitry 48 is coupled between a secondary RF signal node 58 and the secondary antenna 44. The reconfigurable RF filtering circuitry 52 is coupled between the first band filtering circuitry 54, the second band filtering circuitry 56, and the front end diplexer 50.

The primary antenna swapping circuitry 46 includes a number of primary antenna swapping switches $SW_{PAS}$. The secondary antenna swapping circuitry 48 includes a number of secondary antenna swapping switches $SW_{PAS}$. Together, the primary antenna swapping switches $SW_{PAS}$ and the secondary antenna swapping switches $SW_{PAS}$ are configured to couple one of the primary antenna 42 and the secondary antenna 44 to the front end diplexer 50 and couple the other one of the primary antenna 42 and the secondary antenna 44 to the secondary RF signal node 58. While not shown in order to avoid obscuring the drawings, the secondary RF signal node 58 is generally coupled to secondary RF filtering circuitry in order to separate secondary RF receive signals into their constituent operating bands for further processing. Those skilled in the art will appreciate that the one of the primary antenna 42 and the secondary antenna 44 coupled to the front end diplexer 50 is dependent on current signal conditions, and that the primary antenna 42 and the secondary antenna 44 may be dynamically swapped as desired in order to improve transmission and/or reception characteristics.

The front end diplexer 50 is configured to separate RF receive signals from one of the primary antenna 42 and the secondary antenna 44 into those RF receive signals within a first RF frequency band and those RF receive signals within a second RF frequency band. In one embodiment, the first RF frequency band is a low-band, encompassing frequencies between 700 MHz and 1000 MHz, and the second RF frequency band is a mid/high-band, encompassing frequencies between 1800 MHz and 2700 MHz. Those skilled in the art will appreciate that the principles of the present disclosure may be applied to RF signals falling within any number of different frequency bands or combinations of frequency bands, all of which are contemplated herein. The RF receive signals within the first RF frequency band are delivered to a low-band RF signal node 60, while the RF receive signals within the second RF frequency band are delivered to the reconfigurable RF filtering circuitry 52. Further, the front end diplexer 50 is configured to combine RF transmit signals from the low-band RF signal node 60 and the reconfigurable RF filtering circuitry 52 and provide these RF transmit signals to one of the primary antenna 42 and the secondary antenna 44 for transmission.

In order to address the issues discussed above with respect to separating RF signals that are relatively close together in frequency, the reconfigurable RF filtering circuitry 52 includes a first diplexer 62A and a second diplexer 62B. The first diplexer 62A is configured to separate RF signals within a third RF frequency band from RF signals within a first subset of a fourth RF frequency band, while the second diplexer 62B is configured to separate RF signals within the third RF frequency band from RF signals within a second subset of the fourth RF frequency band. In one embodiment, the third RF frequency band and the fourth RF frequency bands are subsets of the second RF frequency band. For example, the third RF frequency band may be a mid-band encompassing frequencies between 1800 MHz and 2200 MHz, and the fourth RF frequency band may be a high-band encompassing frequencies between 2300 MHz and 2700 MHz. Those skilled in the art will appreciate that the principles of the present disclosure may be applied to RF signals falling within any number of different frequency bands, all of which are contemplated herein. The first subset of the fourth RF frequency band may include a relatively narrow portion thereof nearest the third RF frequency band (e.g., from 2300 MHz to 2400 MHz in the exemplary embodiment discussed above). The second subset of the fourth RF frequency band may include the remainder of the fourth RF frequency band (e.g., from 2500 MHz to 2700 MHz). In various embodiments, the first subset and the second subset may overlap. Due to the relatively narrow portion of the fourth RF frequency band passed by the first diplexer 62A, the selectivity of this portion of the diplexer may be significantly improved such that the first diplexer 62A can adequately separate RF signals within the third RF frequency band from RF signals within the fourth RF frequency band, even when they are relatively close to one another in frequency.

The first band filtering circuitry 54 and the second band filtering circuitry 56 include a number of band filtering switches $SW_{BF}$ and a number of band filters 64. The band filtering switches $SW_{BF}$ are configured to couple one or more of the band filters 64 to one of the first diplexer 62A and the second diplexer 62B in the reconfigurable RF filtering circuitry 52, or to bypass the reconfigurable RF filtering circuitry 52 in order to couple the one or more band filters 64 directly to the front end diplexer 50. In comparison to the conventional RF front end circuitry shown in FIG. 1, the switches that were previously included in the reconfigurable RF filtering circuitry 52 are moved into the first band filtering circuitry 54 and the second band filtering circuitry 56. Such a change in the configuration of the RF front end circuitry 40 reduces the insertion loss in the signal paths thereof as discussed below.

Each one of the band filters 64 is configured to isolate an RF signal within a particular operating band (or in some cases, RF signals within multiple operating bands) from other RF signals. RF receive signals from one of the front end diplexer 50 and the reconfigurable RF filtering circuitry 52 are isolated via an appropriate one of the band filters 64 and delivered to an appropriate one of a number of input/output nodes 66. RF transmit signals from downstream circuitry are received at one of the input/output nodes 66, isolated by an appropriate one of the band filters 64, and delivered to one of the front end diplexer 50 and the reconfigurable RF filtering circuitry 52 for transmission from one of the primary antenna 42 and the secondary antenna 44. Generally, only the band filters 64 associated with the particular operating bands being transmitted or received are coupled to the one of the front end diplexer 50 and the reconfigurable RF filtering circuitry 52 to avoid excessive loading of the signal paths.

Control circuitry 68 is coupled to each one of the primary antenna swapping circuitry 46, the secondary antenna swapping circuitry 48, the first band filtering circuitry 54, and the second band filtering circuitry 56 in order to control the state of the switches therein and effectuate the functionality discussed herein. A first signal coupler 70 and a second signal coupler 72 may be provided at the output of each one of the first band filtering circuitry 54 and the second band filtering circuitry 56 in order to detect a signal strength of transmission signals therefrom for a power control loop. Those skilled in the art will appreciate the details of these signal couplers, and thus a discussion of the specifics thereof is not included herein.

In carrier aggregation configurations in which RF signals within the third RF frequency band are simultaneously received along with RF signals within the fourth RF frequency band and there is a relatively small frequency delta (e.g., <150 MHz) between the RF signals, the band filtering switching elements $SW_{BF}$ are configured to couple the first diplexer 62A between the first band filtering circuitry 54, the second band filtering circuitry 56, and the front end diplexer 50. Accordingly, RF receive signals within the third RF frequency band and RF receive signals within the fourth RF frequency band that are relatively close in frequency can be adequately separated by the first diplexer 62A and delivered to the first band filtering circuitry 54 and the second band filtering circuitry 56. In carrier aggregation configurations in which RF signals within the third RF frequency band are simultaneously received along with RF signals within the fourth RF frequency band and there is a relatively large frequency delta (e.g., >150 MHz) between the RF signals, the band filtering switching elements $SW_{BF}$ are configured to couple the second diplexer 62B between the first band filtering circuitry 54, the second band filtering circuitry 56, and the front end diplexer 50. Accordingly, RF receive signals within the third RF frequency band and RF receive signals within the fourth RF frequency band that are relatively far apart in frequency can be adequately separated by the second diplexer 62B and delivered to the first band filtering circuitry 54 and the second band filtering circuitry 56. In non-carrier aggregation configurations, the band filtering switches $SW_{BF}$ are configured to directly couple one of the first band filtering circuitry 54 and the second band filtering circuitry 56 to the front end diplexer 50. The first diplexer 62A and the second diplexer 62B can be bypassed in this case since the RF receive signals will fall within a single one of the third RF frequency band and the fourth RF frequency band. Accordingly, in non-carrier aggregation configurations in which the first diplexer 62A and the second diplexer 62B are not necessary, the insertion loss associated therewith can be avoided.

In order to separate RF signals within the third RF frequency band from RF signals within the fourth RF frequency band when there is a relatively small frequency delta between the RF signals, the first diplexer 62A may be a bandpass-bandstop architecture wherein a bandpass filter response passes RF signals within the first subset of the fourth RF frequency band and the bandstop response blocks signals within the first subset of the fourth RF frequency band. Details of such a diplexer configuration are discussed at length in U.S. patent application Ser. No. 15/194,804, now U.S. Pat. No. 9,966,927, issued May 8, 2018, the contents of which are hereby incorporated by reference in their entirety. Due to the bandpass-bandstop architecture of the first diplexer 62A, the diplexer may also be used to separate RF signals within the first subset of the fourth RF frequency band from RF signals within the second subset of the fourth RF frequency band such that these signals can also be carrier aggregated.

Figure 4A:
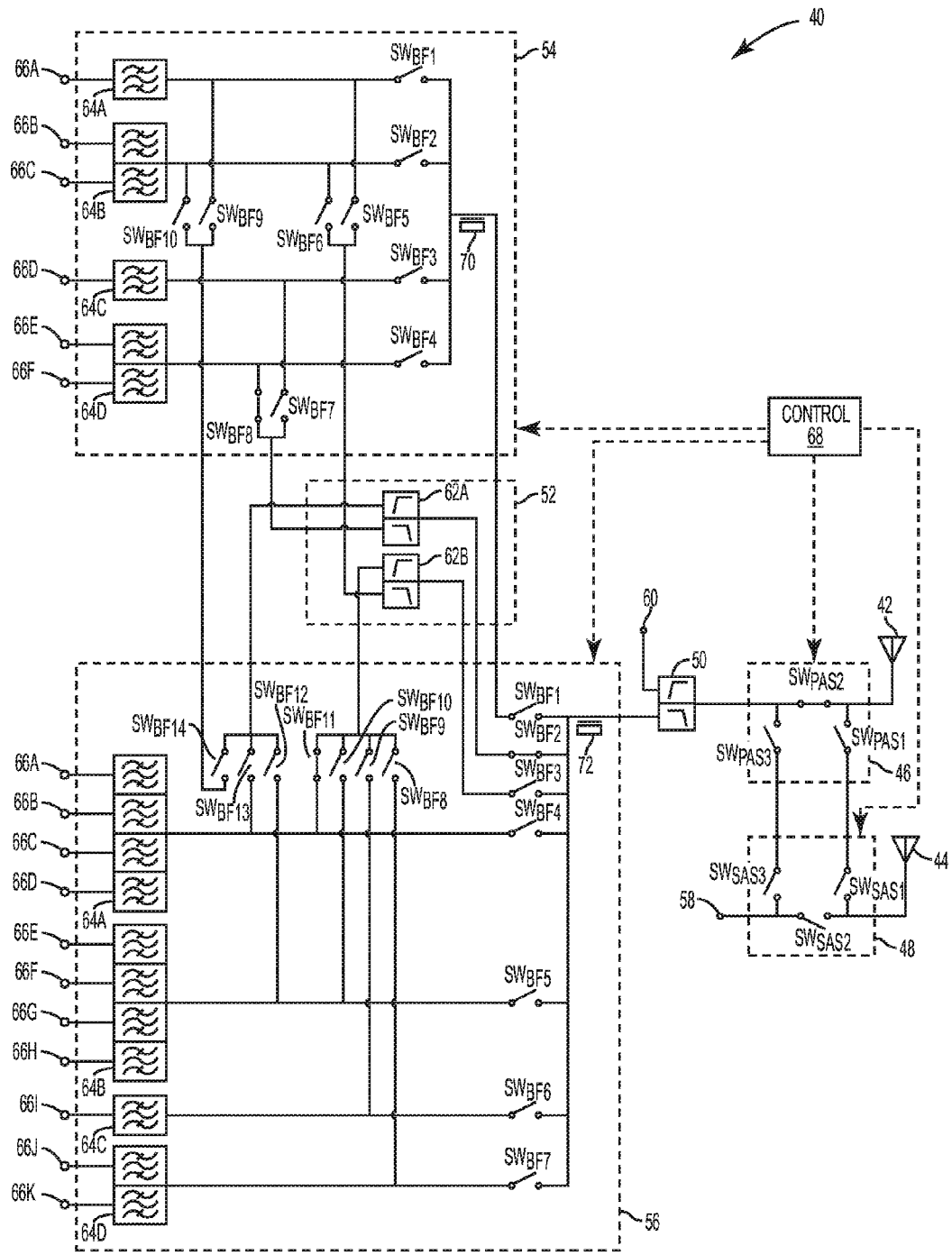
FIGS. 4A through 4C are functional schematics illustrating different switching configurations for the RF front end circuitry shown in FIG. 3 according to various embodiments of the present disclosure.

FIG. 4A shows a switch configuration for the RF front end circuitry 40 in which the first diplexer 62A in the reconfigurable RF filtering circuitry 52 is used to perform carrier aggregation between one or more RF signals within the third RF frequency band and one or more RF signals within the fourth RF frequency band via the primary antenna 42. As shown, a second one of the primary antenna swapping switches $SW_{PAS2}$ is closed, while the remaining primary antenna swapping switches $SW_{PAS}$ are open. Further, an eighth one of the band filtering switches $SW_{BFB}$ in the first band filtering circuitry 54 is closed while the remaining band filtering switches $SW_{BF}$ therein are open. A second one of the band filtering switches $SW_{BF2}$ and an eleventh one of the band filtering switches $SW_{BF11}$ are closed in the second band filtering circuitry 56, while the remaining band filtering switches $SW_{BF}$ therein are open. Assuming a 0.20 dB insertion loss for each closed series switch in the signal path and a 0.025 dB insertion loss for each open parallel switch, a signal path from the primary antenna 42 to a fifth one of the input/output nodes 66E of the first band filtering circuitry 54 includes three closed series switches and twelve open parallel switches for a total insertion loss of 0.9 dB. A similar result is achieved when the second diplexer 62B in the reconfigurable RF filtering circuitry 52 is used to perform carrier aggregation between one or more RF signals within the third RF frequency band and one or more RF signals within the fourth RF frequency band. Additional switches are added in the signal path when the secondary antenna 44 is used in these configurations, however, this is generally of little concern since the primary antenna 42 is used most of the time when transmission and/or reception characteristics are favorable.

Figure 4B:
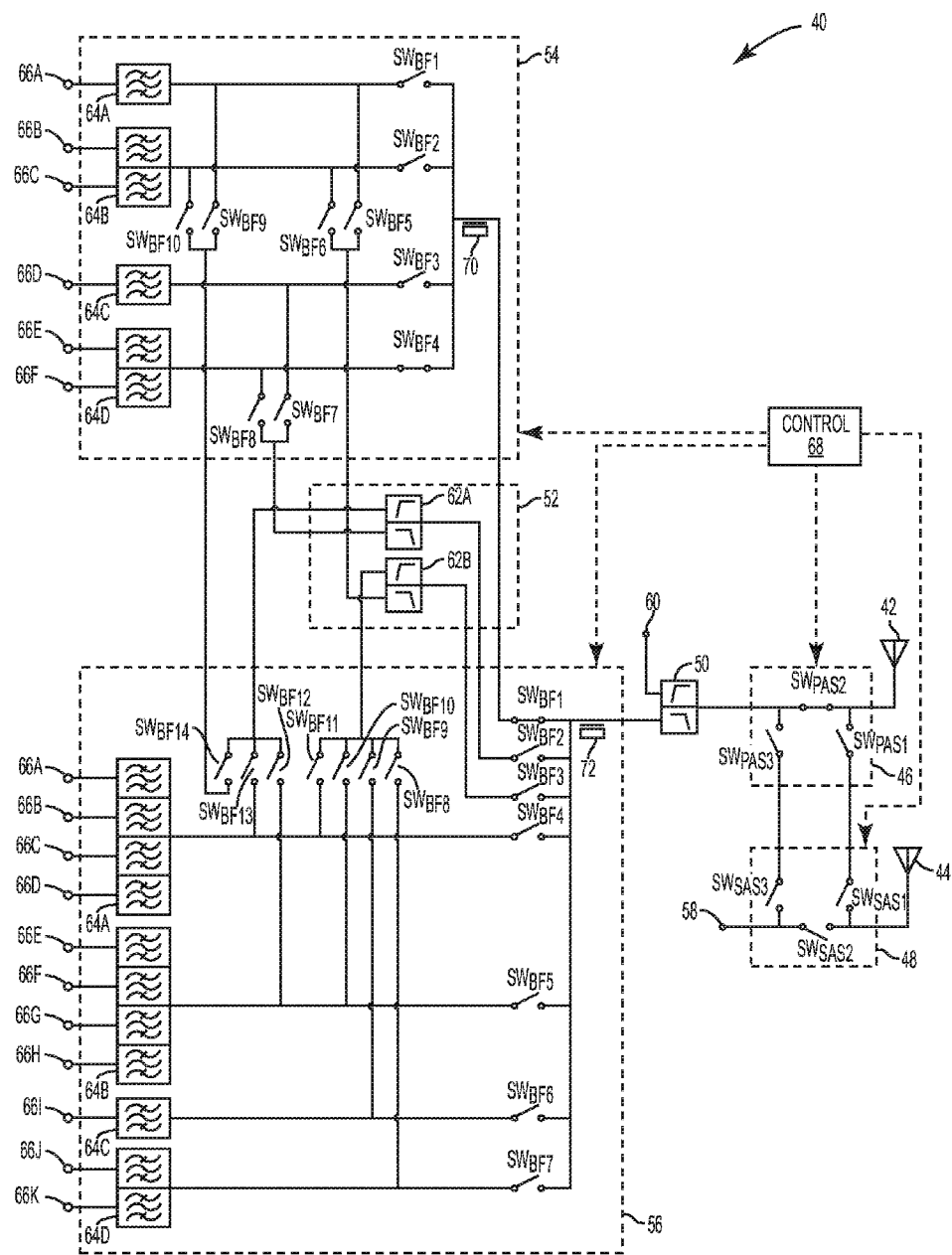

FIG. 4B shows a switch configuration in which the first diplexer 62A and the second diplexer 62B are bypassed in a non-carrier aggregation mode. In the particular example shown in FIG. 4B, the primary antenna 42 is coupled via the front end diplexer 50 to the first band filtering circuitry 54. Accordingly, a second one of the primary antenna swapping switches $SW_{PAS2}$ is closed, while the remaining primary antenna swapping switches $SW_{PAS}$ are open. Further, a fourth one of the band filtering switches $SW_{BF4}$ in the first band filtering circuitry 54 is closed while the remaining band filtering switches $SW_{BF}$ therein are open. A first one of the band filtering switches $SW_{BF1}$ in the second band filtering circuitry 56 is closed, while the remaining band filtering switches $SW_{BF}$ therein are open. Again assuming a 0.20 dB insertion loss for each closed series switch in the signal path and a 0.025 dB insertion loss for each open parallel switch, a signal path from the primary antenna 42 to the fifth one of the input/output nodes 66E of the first band filtering circuitry 54 includes three closed series switches and eleven open parallel switches for a total insertion loss of 0.875 dB.

Figure 4C:
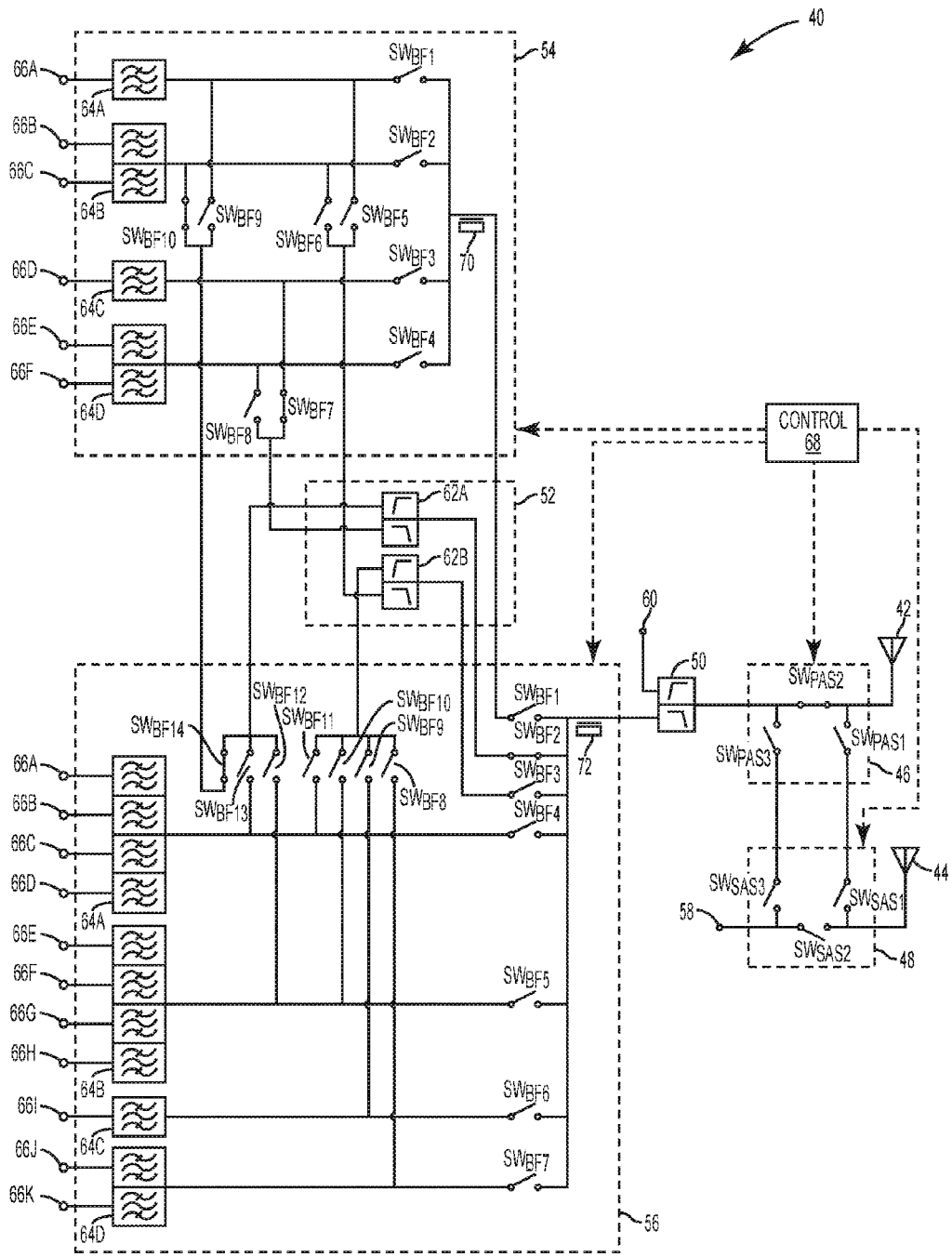

FIG. 4C shows a switch configuration in which the first diplexer 62A is used for carrier aggregation between RF signals within the first subset of the fourth RF frequency band and RF signals within the second subset of the fourth RF frequency band. As discussed above, the first diplexer 62A may have a bandpass-bandstop architecture that may be used to separate RF signals within the first subset of the fourth RF frequency band from RF signals within the second subset of the fourth RF frequency band. Accordingly, a second one of the primary antenna swapping switches $SW_{PAS2}$ is closed, while the remaining primary antenna swapping switches $SW_{PAS}$ are open. Further, a seventh one of the band filtering switches $SW_{BF7}$ and a tenth one of the band filtering switches $SW_{BF10}$ in the first band filtering circuitry 54 are closed while the remaining band filtering switches $SW_{BF}$ therein are open. A second one of the band filtering switches $SW_{BF2}$ and a fourteenth one of the band filtering switches $SW_{BF14}$ in the second band filtering circuitry 56 are closed, while the remaining band filtering switches $SW_{BF}$ therein are open. In this configuration, RF signals within the first subset of the fourth RF frequency band are routed to a second one of the band filters 64B in the first band filtering circuitry 54 while RF signals within the second subset of the fourth RF frequency band are routed to a third one of the band filters 64C in the first band filtering circuitry 54, thereby allowing carrier aggregation between these RF signals. Again assuming a 0.20 dB insertion loss for each closed series switch in the signal path and a 0.025 dB insertion loss for each open parallel switch, a signal path from the primary antenna 42 to the second one of the input/output nodes 66B and the fourth one of the input/output nodes 66D of the first band filtering circuitry 54 includes three closed series switches and ten open parallel switches for a total insertion loss of 0.85 dB.

Figure 5:
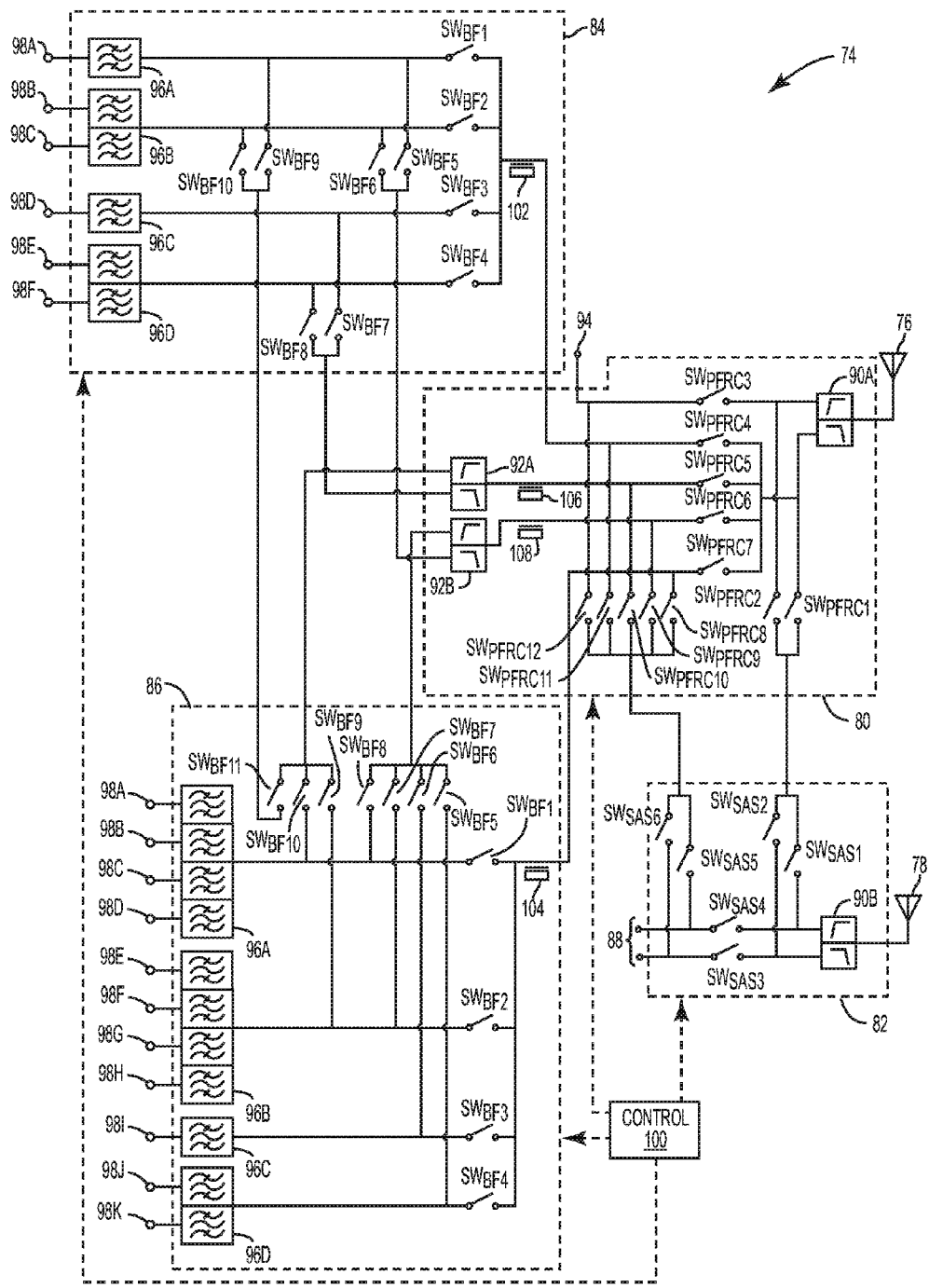
FIG. 5 is a functional schematic illustrating RF front end circuitry according to one embodiment of the present disclosure.

FIG. 5 shows RF front end circuitry 74 according to an additional embodiment of the present disclosure. The RF front end circuitry 74 includes a primary antenna 76, a secondary antenna 78, primary antenna swapping and reconfigurable RF filtering circuitry 80, secondary antenna swapping circuitry 82, first band filtering circuitry 84, and second band filtering circuitry 86. The primary antenna swapping and reconfigurable RF filtering circuitry 80 is coupled between the first band filtering circuitry 84, the second band filtering circuitry 86, and the primary antenna 76. The secondary antenna swapping circuitry 82 is coupled between a number of secondary RF signal nodes 88 and the secondary antenna 78.

The primary antenna swapping and reconfigurable RF filtering circuitry 80 includes a first front end diplexer 90A, a first reconfigurable RF filtering circuitry diplexer 92A, a second reconfigurable RF filtering circuitry diplexer 92B, and a number of primary antenna swapping and reconfigurable RF filtering circuitry switches $SW_{PFRC}$. The secondary antenna swapping circuitry 82 includes a second front end diplexer 90B and a number of secondary antenna swapping switches $SW_{SAS}$. Together, the primary antenna swapping and reconfigurable RF filtering circuitry switches $SW_{PFRC}$ and the secondary antenna swapping switches $SW_{SAS}$ are configured to couple one or more of the first band filtering circuitry 84, the second band filtering circuitry 86, the first reconfigurable RF filtering circuitry diplexer 92A, the second reconfigurable RF filtering circuitry diplexer 92B, a low-band RF signal node 94, and the secondary RF signal nodes 88 to one of the primary antenna 76 (via the first front end diplexer 90A) and the secondary antenna 78 (via the second front end diplexer 90B), and couple the other one of the primary antenna 76 and the secondary antenna 78 to one or more of the secondary RF signal nodes 88. While not shown to avoid obscuring the drawings, the secondary RF signal nodes 88 are generally coupled to secondary RF filtering circuitry in order to separate secondary RF receive signals into their constituent RF operating bands for further processing. Those skilled in the art will appreciate that the connections to the primary antenna 76 and the secondary antenna 78 may be dependent on current signal conditions, and that the primary antenna 76 and the secondary antenna 78 may be dynamically swapped as desired in order to improve transmission and/or reception characteristics.

The first front end diplexer 90A is configured to separate RF receive signals from the primary antenna 76 into those RF receive signals within a first RF frequency band and those RF receive signals within a second RF frequency band. In one embodiment, the first RF frequency band is a low-band, encompassing frequencies between 700 MHz and 1000 MHz, and the second RF frequency band is a mid/high-band, encompassing frequencies between 1800 MHz and 2700 MHz. Those skilled in the art will appreciate that the principles of the present disclosure may be applied to RF signals falling within any number of different frequency bands or combinations of frequency bands, all of which are contemplated herein. The RF receive signals within the first RF frequency band are delivered to a number of the primary antenna swapping and reconfigurable RF filtering circuitry switches $SW_{PFRC}$, which may then route the signals to one of the low-band RF signal node 94 and the secondary antenna swapping circuitry 82. The RF receive signals within the second RF frequency band are delivered to different ones of the primary antenna swapping and reconfigurable RF filtering switches $RF_{PSRF}$, which may then route the signals to one of the first reconfigurable RF filtering circuitry diplexer 92A, the second reconfigurable RF filtering circuitry diplexer 92B, the first band filtering circuitry 84, the second band filtering circuitry 86, and the secondary antenna swapping circuitry 82. Further, the first front end diplexer 90A is configured to combine RF transmit signals within the first RF frequency band and RF transmit signals within the second RF frequency band received from various ones of the primary antenna swapping and reconfigurable RF filtering switches SW PSRF and provide these RF transmit signals to the primary antenna 76 for transmission. The second front end diplexer 90B functions similarly to the first front end diplexer 90A.

By combining the switches for antenna swapping and routing of RF signals between the first reconfigurable RF filtering circuitry diplexer 92A, the second reconfigurable RF filtering circuitry diplexer 92B, the first band filtering circuitry 84, and the second band filtering circuitry 86, the number of switches in any given signal path during operation of the RF front end circuitry 74 may be reduced, thereby reducing insertion loss and improving performance as discussed below.

In order to address the issues discussed above with respect to separating RF signals that are relatively close together in frequency, the primary antenna swapping circuitry and reconfigurable RF filtering circuitry 80 includes the first reconfigurable RF filtering circuitry diplexer 92A and the second reconfigurable RF filtering circuitry diplexer 92B. The first reconfigurable RF filtering circuitry diplexer 92A is configured to separate RF signals within a third RF frequency band from RF signals within a first subset of a fourth RF frequency band, while the second reconfigurable RF filtering circuitry diplexer 92B is configured to separate RF signals within the third RF frequency band from RF signals within a second subset of the fourth RF frequency band. In one embodiment, the third RF frequency band and the fourth RF frequency band are subsets of the second RF frequency band. For example, the third RF frequency band may be a mid-band encompassing frequencies between 1800 MHz and 2200 MHz, and the fourth RF frequency band may be a high-band encompassing frequencies between 2300 MHz and 2700 MHz. Those skilled in the art will appreciate that the principles of the present disclosure may be applied to RF signals falling within any number of different frequency bands, all of which are contemplated herein. The first subset of the fourth RF frequency band may include a relatively narrow portion thereof nearest the third RF frequency band (e.g., from 2300 MHz to 2400 MHz in the exemplary embodiment discussed above). The second subset of the fourth RF frequency band may include the remainder of the fourth RF frequency band (e.g., from 2500 MHz to 2700 MHz). In various embodiments, the first subset and the second subset may overlap. Due to the relatively narrow portion of the fourth RF frequency band passed by the first reconfigurable RF filtering circuitry diplexer 92A, the selectivity of this portion of the diplexer may be significantly improved such that the first reconfigurable RF filtering circuitry diplexer 92A can adequately separate RF signals within the third RF frequency band from RF signals within the fourth RF frequency band, even when they are relatively close to one another in frequency.

The first band filtering circuitry 84 and the second band filtering circuitry 86 include a number of band filtering switches $SW_{BF}$ and a number of band filters 96. The band filtering switches $SW_{BF}$ are configured to couple one or more of the band filters 96 to the primary antenna swapping and reconfigurable RF filtering circuitry 80. Each one of the band filters 96 is configured to isolate an RF signal within a particular RF operating band (or in some cases, RF signals within multiple RF operating bands) from other RF signals. In one embodiment, the band filters 96 in the first band filtering circuitry 84 are associated with RF operating bands located in the third RF frequency band, while the band filters 96 in the second band filtering circuitry 86 are associated with RF operating bands located in the fourth RF frequency band. In operation, RF receive signals from the primary antenna swapping and reconfigurable RF filtering circuitry 80 are isolated via an appropriate one of the band filters 96 and delivered to an appropriate one of a number of input/output nodes 98. RF transmit signals from downstream circuitry are received at one of the input/output nodes 98, isolated by an appropriate one of the band filters 96, and delivered to the primary antenna swapping and reconfigurable RF filtering circuitry 80 for transmission from one of the primary antenna 76 and the secondary antenna 78. Generally, only the band filters 96 associated with the particular RF operating bands being transmitted or received are coupled to the primary antenna swapping and reconfigurable RF filtering circuitry 80 to avoid excessive loading of the signal paths.

Similar to the first diplexer 62A discussed above with respect to FIG. 3, the first reconfigurable RF filtering circuitry diplexer 92A may have a bandpass-bandstop architecture that allows for the separation of RF signals within the first subset of the fourth RF frequency band and the second subset of the RF frequency band.

Control circuitry 100 is coupled to each one of the primary antenna swapping and reconfigurable RF filtering circuitry 80, the secondary antenna swapping circuitry 82, the first band filtering circuitry 84, and the second band filtering circuitry 86 in order to control the state of the switches therein and effectuate the functionality discussed herein. A first signal coupler 102 and a second signal coupler 104 may be provided at the output of each one of the first band filtering circuitry 84 and the second band filtering circuitry 86, respectively, in order to detect a signal strength of transmission signals therefrom for a power control loop. However, since multiple outputs from each one of the first band filtering circuitry 84 and the second band filtering circuitry 86 exist in the RF front end circuitry 74, a first additional signal coupler 106 and a second additional signal coupler 108 are added to ensure that transmission signals can be measured for power control. Providing the first additional signal coupler 106 and the second additional signal coupler 108 covers each egress path for a transmission signal in the RF front end circuitry 74, such that measurements for power control are possible with a minimal number of signal couplers. Those skilled in the art will appreciate the details of the signal couplers, and thus a discussion of the specifics thereof is not included herein.

In carrier aggregation configurations in which RF signals within the third RF frequency band are simultaneously received along with RF signals within the fourth RF frequency band at the primary antenna 76 and there is a relatively small frequency delta (e.g., <150 MHz) between the RF signals, the primary antenna swapping and reconfigurable RF filtering circuitry switches $SW_{PFRC}$ along with the band filtering switches $SW_{BF}$ are configured to couple the first reconfigurable RF filtering circuitry diplexer 92A between the first band filtering circuitry 84, the second band filtering circuitry 86, and the first front end diplexer 90A. Accordingly, RF receive signals can be adequately separated by the first front end diplexer 90A and the first reconfigurable RF filtering circuitry diplexer 92A and delivered to the first band filtering circuitry 84 and the second band filtering circuitry 86 for separation into their constituent RF operating bands.

In carrier aggregation configurations in which RF signals within the third RF frequency band are simultaneously received along with RF signals within the fourth RF frequency band at the primary antenna 76 and there is a relatively large frequency delta (e.g., >150 MHz) between the RF signals, the primary antenna swapping and reconfigurable RF filtering circuitry switches $SW_{PFRC}$ along with the band filtering switches $SW_{BF}$ are configured to couple the second reconfigurable RF filtering circuitry diplexer 92B between the first band filtering circuitry 84, the second band filtering circuitry 86, and the first front end diplexer 90A. Accordingly, RF receive signals can be adequately separated by the first front end diplexer 90A and the second reconfigurable RF filtering circuitry diplexer 92B and delivered to the first band filtering circuitry 84 and the second band filtering circuitry 86 for separation into their constituent RF operating bands.

In non-carrier aggregation configurations, the primary antenna swapping and reconfigurable RF filtering circuitry switches $SW_{PFRC}$ along with the band filtering switches $SW_{BF}$ are configured to bypass the first reconfigurable RF filtering circuitry diplexer 92A and the second reconfigurable RF filtering circuitry diplexer 92B, directly coupling one of the first band filtering circuitry 84 and the second band filtering circuitry 86 to the first front end diplexer 90A. The first reconfigurable RF filtering circuitry diplexer 92A and the second reconfigurable RF filtering circuitry diplexer 92B may be bypassed in this case since the RF receive signals will fall within a single one of the third RF frequency band and the fourth RF frequency band. Accordingly, in non-carrier aggregation configurations in which the first reconfigurable RF filtering circuitry diplexer 92A and the second reconfigurable RF filtering circuitry diplexer 92B are not necessary, the insertion loss associated therewith can be avoided.

Figure 6A:
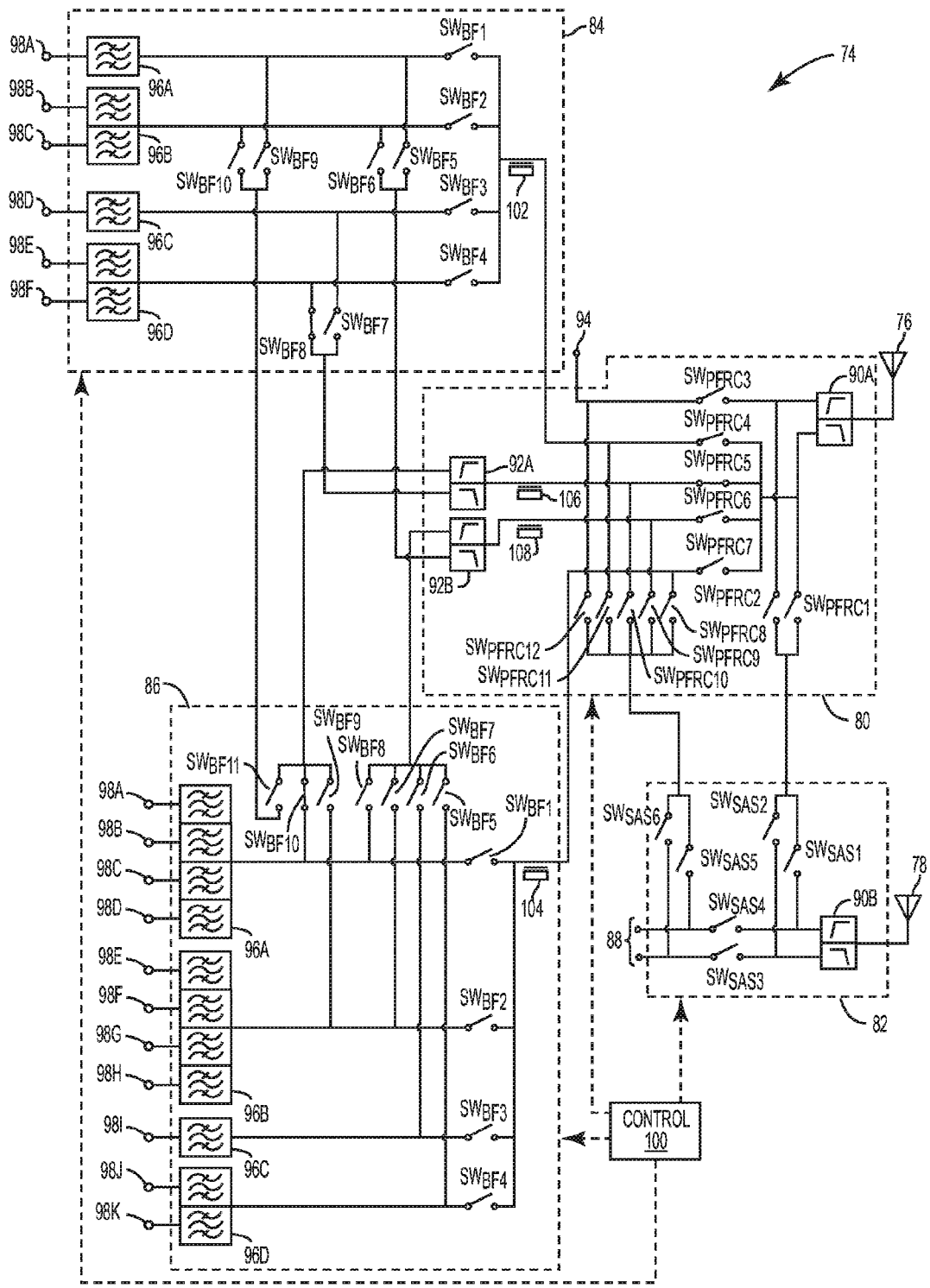
FIGS. 6A through 6C are functional schematics illustrating different switching configurations for the RF front end circuitry shown in FIG. 5 according to various embodiments of the present disclosure.

FIG. 6A shows a switch configuration for the RF front end circuitry 74 in which the first reconfigurable RF filtering circuitry diplexer 92A in the primary antenna swapping and reconfigurable RF filtering circuitry 80 is used to perform carrier aggregation between one or more RF signals within the third RF frequency band and one or more RF signals within the fourth RF frequency band via the primary antenna 76. As shown, a fifth one of the primary antenna swapping and reconfigurable RF filtering circuitry switches $SW_{PFRC5}$ is closed, while the remaining primary antenna swapping and reconfigurable RF filtering circuitry switches $SW_{PFRC}$ are open. Further, an eighth one of the band filtering switches $SW_{BF8}$ in the first band filtering circuitry 84 is closed while the remaining band filtering switches $SW_{BF}$ therein are open. A tenth one of the band filtering switches $SW_{BF10}$ in the second band filtering circuitry 86 is closed while the remaining band filtering switches $SW_{BF}$ therein are open. Assuming a 0.20 dB insertion loss for each closed series switch in the signal path and a 0.025 dB insertion loss for each open parallel switch, a signal path from the primary antenna 76 to a fifth one of the input/output nodes 98E of the first band filtering circuitry 84 includes two closed series switches and seven open parallel switches for a total insertion loss of 0.575 dB. A similar result is achieved when the second reconfigurable RF filtering circuitry diplexer 92B is used to perform carrier aggregation between one or more RF signals within the third RF frequency band and one or more RF signals within the fourth RF frequency band. Additional switches are added in the signal path when the secondary antenna 78 is used in these configurations, however, this is generally of little concern since the primary antenna 76 is used most of the time when transmission and/or reception characteristics are favorable.

Figure 6B:
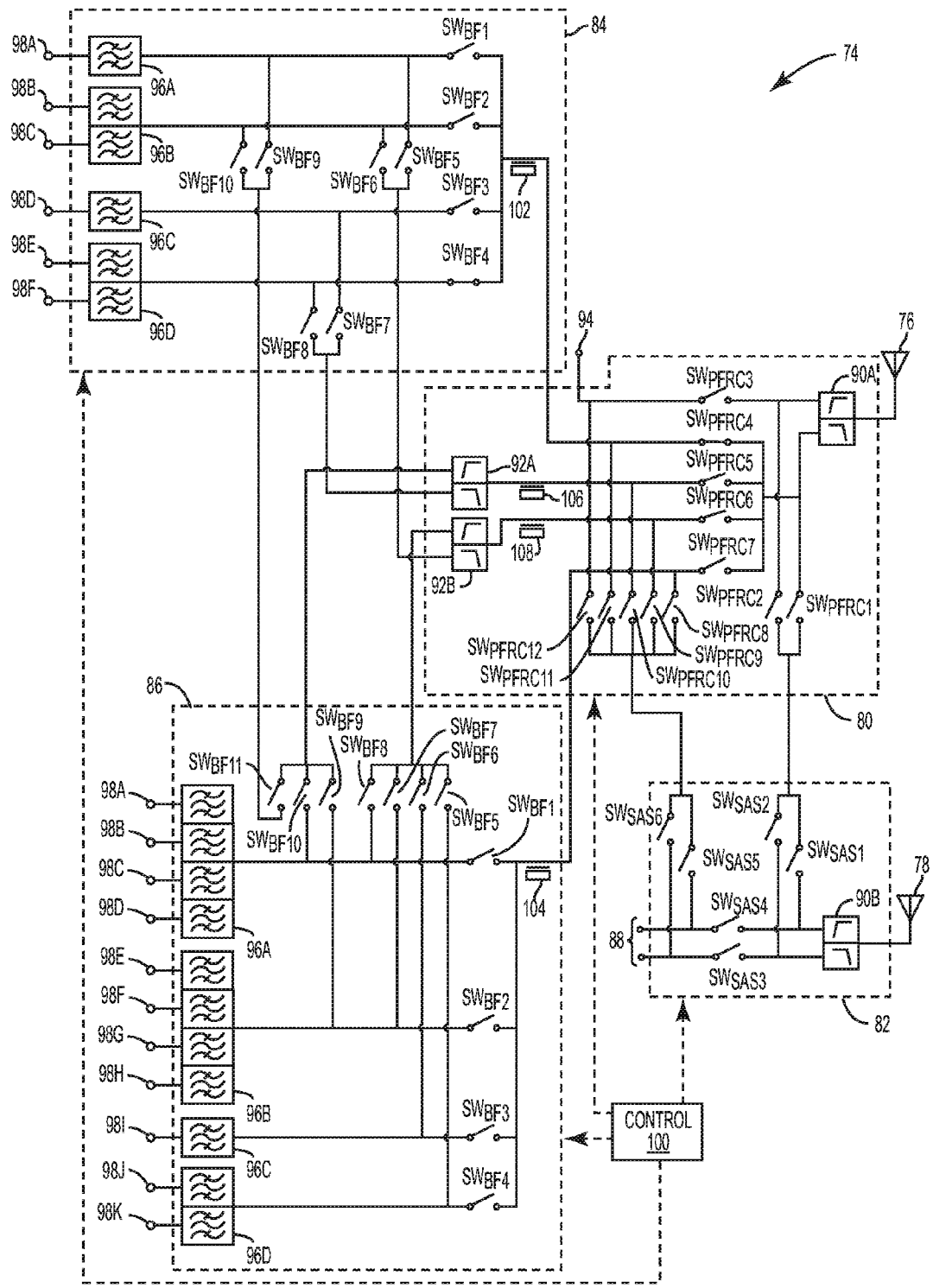

FIG. 6B shows a switch configuration in which the first reconfigurable RF filtering circuitry diplexer 92A and the second reconfigurable RF filtering circuitry diplexer 92B are bypassed in a non-carrier aggregation mode. In the particular example shown in FIG. 6B, the primary antenna 76 is coupled via the first front end diplexer 90A to the first band filtering circuitry 84. Accordingly, a fourth one of the primary antenna swapping and reconfigurable RF filtering circuitry switches $SW_{PFRC4}$ is closed, while the remaining primary antenna swapping and reconfigurable RF filtering switches $SW_{PSRF}$ are open. Further, a fourth one of the band filtering switches $SW_{BF4}$ in the first band filtering circuitry 84 is closed while the remaining band filtering switches $SW_{BF}$ therein are open. Again assuming a 0.20 dB insertion loss for each closed series switch in the signal path and a 0.025 dB insertion loss for each open parallel switch, a signal path from the primary antenna 76 to the fifth one of the input/output nodes 98E of the first band filtering circuitry 84 includes two closed series switches and nine open parallel switches for a total insertion loss of 0.625 dB.

Figure 6C:
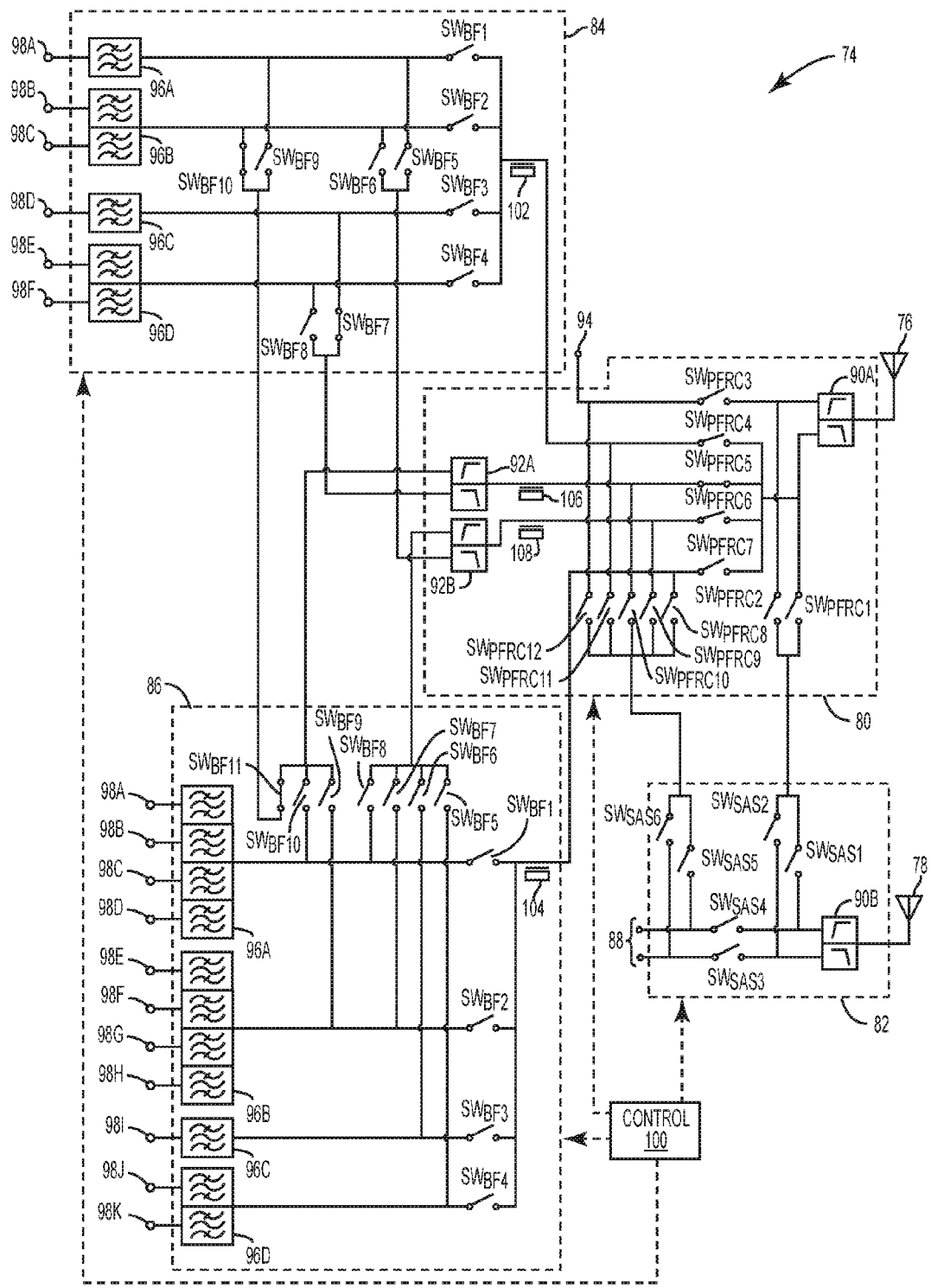

FIG. 6C shows a switch configuration in which the first reconfigurable RF filtering circuitry diplexer 92A is used for carrier aggregation between RF signals within the first subset of the fourth RF frequency band and RF signals within the second subset of the fourth RF frequency band. As discussed above, the first reconfigurable RF filtering circuitry diplexer 92A may have a bandpass-bandstop architecture that may be used to separate RF signals within the first subset of the fourth RF frequency band from RF signals within the second subset of the fourth RF frequency band. Accordingly, a fifth one of the primary antenna swapping and reconfigurable RF filtering circuitry switches $SW_{PFRC5}$ is closed, while the remaining primary antenna swapping and reconfigurable RF filtering switches $SW_{PSRF}$ are open. Further, a seventh one of the band filtering switches $SW_{BF7}$ and a tenth one of the band filtering switches $SW_{BF10}$ in the first band filtering circuitry 84 are closed while the remaining band filtering switches $SW_{BF}$ therein are open. An eleventh one of the band filtering switches $SW_{BF11}$ in the second band filtering circuitry 86 is closed while the remainder of the band filtering switches $SW_{BF}$ are open. Again assuming a 0.20 dB insertion loss for each closed series switch in the signal path and a 0.025 dB insertion loss for each open parallel switch, a signal path from the primary antenna 76 to the second one of the input/output nodes 98B of the first band filtering circuitry 84 includes three closed series switches and eight open parallel switches for a total insertion loss of 0.8 dB, while a signal path from the primary antenna 76 to the fourth one of the input/output nodes 98D of the first band filtering circuitry 84 includes two closed series switches and eight open parallel switches for a total insertion loss of 0.6 dB.

Those skilled in the art will recognize improvements and modifications to the preferred embodiments of the present disclosure. All such improvements and modifications are considered within the scope of the concepts disclosed herein and the claims that follow.

What is claimed is:

1. Circuitry comprising:
    a primary antenna node and a secondary antenna node;
    a first set of input/output nodes, each associated with radio frequency (RF) signals within a first RF frequency band;
    a second set of input/output nodes, each associated with RF signals within a second RF frequency band;
    a first diplexer configured to separate RF signals within the first RF frequency band from RF signals within a first subset of the second RF frequency band;
    a second diplexer configured to separate RF signals within the first RF frequency band from RF signals within a second subset of the second RF frequency band;
    switching circuitry coupled between the primary antenna node, the secondary antenna node, the first set of input/output nodes, the second set of input/output nodes, the first diplexer, and the second diplexer; and means for controlling the switching circuitry configured to cause the switching circuitry to:
- in a carrier aggregation mode of operation between RF signals within the first RF frequency band and RF signals within the second RF frequency band, couple at least one of the first set of input/output nodes and at least one of the second set of input/output nodes to one of the primary antenna node and the secondary antenna node via one of the first diplexer and the second diplexer such that an insertion loss due to switching elements in the path between the at least one of the first set of input/output nodes and the primary antenna node is between 0.575 dB and 0.9 dB; and
- in a non-carrier aggregation mode of operation, couple at least one of the first set of input/output nodes and the second set of input/output nodes to one of the primary antenna node and the secondary antenna node such that the first diplexer and the second diplexer are bypassed and an insertion loss due to switching elements in the path between the at least one of the first set of input/output nodes and the primary antenna node is between 0.625 dB and 0.9 dB.

2. The circuitry of claim 1 further comprising:
first band filtering circuitry coupled between the first diplexer, the second diplexer, and the first set of input/output nodes, the first band filtering circuitry configured to isolate RF signals within different RF operating bands of the first RF frequency band and separately deliver them to different ones of the first set of input/output nodes; and
second band filtering circuitry coupled between the first diplexer, the second diplexer, and the second set of input/output nodes, the second band filtering circuitry configured to isolate RF signals within different RF operating bands of the second RF frequency band and separately deliver them to different ones of the second set of input/output nodes.

3. The circuitry of claim 2 further comprising a first front-end diplexer coupled between the switching circuitry and the primary antenna and a second front-end diplexer coupled between the switching circuitry and the secondary antenna.

4. The circuitry of claim 2 wherein in the carrier aggregation mode only two closed series switches are located between at least one of the first set of input/output nodes and the primary antenna node.

5. The circuitry of claim 4 further comprising a first front-end diplexer coupled between the switching circuitry and the primary antenna and a second front-end diplexer coupled between the switching circuitry and the secondary antenna.

6. The circuitry of claim 1 wherein in the carrier aggregation mode only two closed series switches are located between the at least one of the first set of input/output nodes and the primary antenna node.

7. The circuitry of claim 6 further comprising a first front-end diplexer coupled between the switching circuitry and the primary antenna and a second front-end diplexer coupled between the switching circuitry and the secondary antenna.

8. The circuitry of claim 1 wherein the first RF frequency band is a mid-band including frequencies between 1800 MHz and 2200 MHz.

9. The circuitry of claim 3 wherein the second RF frequency band is a high-band including frequencies between 2300 MHz and 2700 MHz.

10. The circuitry of claim 4 wherein the first subset of the second RF frequency band is between 2300 MHz and 2400 MHz, and the second subset of the second RF frequency band is between 2500 MHz and 2700 MHz.

11. The circuitry of claim 1 wherein in the carrier aggregation mode of operation the insertion loss due to switching elements in the path between the at least one of the first set of input/output nodes and the primary antenna node is between 0.575 dB and 0.7 dB.

12. The circuitry of claim 11 wherein in the non-carrier aggregation mode of operation the insertion loss due to switching elements in the path between the at least one of the first set of input/output nodes and the primary antenna node is between 0.625 dB and 0.7 dB.

13. Circuitry comprising:
a primary antenna node and a secondary antenna node;
a first set of input/output nodes, each associated with radio frequency (RF) signals within a first RF frequency band;
a second set of input/output nodes, each associated with RF signals within a second RF frequency band;
a first diplexer configured to separate RF signals within the first RF frequency band from RF signals within a first subset of the second RF frequency band;
a second diplexer configured to separate RF signals within the first RF frequency band from RF signals within a second subset of the second RF frequency band;
switching circuitry coupled between the primary antenna node, the first set of input/output nodes, the second set of input/output nodes, the first diplexer, and the second diplexer; and
means for controlling the switching circuitry configured to cause the switching circuitry to:
- in a carrier aggregation mode of operation between RF signals within the first RF frequency band and RF signals within the second RF frequency band, couple at least one of the first set of input/output nodes and at least one of the second set of input/output nodes to one of the primary antenna node and the secondary antenna node via one of the first diplexer and the second diplexer such that only two closed series switching elements are located in the path between the at least one of the first set of input/output nodes and the primary antenna node; and
- in a non-carrier aggregation mode of operation, couple at least one of the first set of input/output nodes and the second set of input/output nodes to one of the primary antenna node and the secondary antenna node such that the first diplexer and the second diplexer are bypassed and only two closed series switching elements are located in the path between the at least one of the first set of input/output nodes and the primary antenna node.

14. The circuitry of claim 13 further comprising:
first band filtering circuitry coupled between the first diplexer, the second diplexer, and the first set of input/output nodes, the first band filtering circuitry configured to isolate RF signals within different RF operating bands of the first RF frequency band and separately deliver them to different ones of the first set of input/output nodes; and
second band filtering circuitry coupled between the first diplexer, the second diplexer, and the second set of input/output nodes, the second band filtering circuitry configured to isolate RF signals within different RF operating bands of the second RF frequency band and separately deliver them to different ones of the second set of input/output nodes.

15. The circuitry of claim 14 further comprising a first front-end diplexer coupled between the switching circuitry and the primary antenna and a second front-end diplexer coupled between the switching circuitry and the secondary antenna.

16. The circuitry of claim 13 wherein the first RF frequency band is a mid-band including frequencies between 1800 MHz and 2200 MHz.

17. The circuitry of claim 16 wherein the second RF frequency band is a high-band including frequencies between 2300 MHz and 2700 MHz.

18. The circuitry of claim 17 wherein the first subset of the second RF frequency band is between 2300 MHz and 2400 MHz, and the second subset of the second RF frequency band is between 2500 MHz and 2700 MHz.

19. The circuitry of claim 14 wherein the means for controlling the switching circuitry is further configured to cause the switching circuitry to:
in a carrier aggregation mode of operation between RF signals within a first subset of the first RF frequency band and RF signals within a second subset of the first RF frequency band, couple a first one of the first set of input/output nodes to one of the primary antenna node and the secondary antenna node via a first band filter in the first band filtering circuitry and couple a second one of the first set of input/output nodes to the same one of the primary antenna node and the secondary antenna node via a second band filter in at least one of the first band filtering circuitry or the second band filtering circuitry via the first diplexer.

20. The circuitry of claim 19 wherein the first subset of the first RF frequency band is between 2300 MHz and 2400 MHz and the second subset of the first RF frequency band is between 2600 MHz and 2700 MHz.

* * * * *

UNITED STATES PATENT AND TRADEMARK OFFICE
CERTIFICATE OF CORRECTION

PATENT NO. : 10,141,957 B2
APPLICATION NO. : 15/430646
DATED : November 27, 2018
INVENTOR(S) : Nadim Khlat and Marcus Granger-Jones Page 1 of 1

It is certified that error appears in the above-identified patent and that said Letters Patent is hereby corrected as shown below:

In the Specification

In Column 2, Lines 20 and 22, replace "$SW_{PAS}$" with --$SW_{SAS}$--.

In Column 7, Lines 64 and 66, replace "$SW_{PAS}$" with --$SW_{SAS}$--.

In Column 10, Line 50, replace "$SW_{BFB}$" with --$SW_{BF8}$--.

In Column 12, Line 67, replace "SW PSRF" with --$SW_{PSRF}$--.

In Column 15, Line 41, replace "$SW_{BFB}$" with --$SW_{BP8}$--.

Signed and Sealed this
Twenty-ninth Day of January, 2019

Andrei Iancu
*Director of the United States Patent and Trademark Office*